US006076157A

United States Patent [19]
Borkenhagen et al.

[11] Patent Number: 6,076,157
[45] Date of Patent: Jun. 13, 2000

[54] METHOD AND APPARATUS TO FORCE A THREAD SWITCH IN A MULTITHREADED PROCESSOR

[75] Inventors: John Michael Borkenhagen; Richard James Eickemeyer; William Thomas Flynn; Andrew Henry Wottreng, all of Rochester, Minn.

[73] Assignee: International Business Machines Corporation, Armonk, N.Y.

[21] Appl. No.: 08/956,577

[22] Filed: Oct. 23, 1997

[51] Int. Cl.[7] .................................. G06F 9/44; G06F 9/24
[52] U.S. Cl. ........................... 712/228; 712/234; 712/23; 712/245; 709/8
[58] Field of Search ............................... 395/184.01, 726, 395/677, 672, 673, 670, 678, 684, 569, 800.26; 364/DIG. 1, DIG. 2; 711/150, 143, 147; 712/233, 245, 234, 228, 23; 709/8, 5, 3; 710/200

[56] References Cited

U.S. PATENT DOCUMENTS

| | | | |
|---|---|---|---|
| 3,373,408 | 3/1968 | Ling | 340/172.5 |
| 3,566,357 | 2/1971 | Ling | 340/172.5 |
| 3,568,173 | 3/1971 | Klinger | 340/174 |
| 3,594,732 | 7/1971 | Mendelson et al. | 340/172.5 |
| 3,728,692 | 4/1973 | Fennel, Jr. | 340/172.5 |
| 3,771,138 | 11/1973 | Celtruda et al. | 340/172.5 |
| 3,916,383 | 10/1975 | Malcolm | 340/172.5 |

(List continued on next page.)

FOREIGN PATENT DOCUMENTS

| | | |
|---|---|---|
| 0474297A2 | 3/1992 | European Pat. Off. |
| 0479390A2 | 4/1992 | European Pat. Off. |
| 0527392 | 2/1993 | European Pat. Off. |
| 0605927A1 | 7/1994 | European Pat. Off. |
| 0617361 | 9/1994 | European Pat. Off. |
| 0747816 | 12/1996 | European Pat. Off. |
| 2234613 | 2/1991 | United Kingdom. |

OTHER PUBLICATIONS

IBM Technical Disclosure Bulletin, vol. 39, No. 08, Aug. 1996, pp 113–116, Entitled "Algorithm for Instruction Cache Arbitration Among Multiple Instruction Streams".

Eickemeyer et al, "Evaluation of Multithreaded Uniprocessors for Commercial Application Enviornments", 23rd International Symposium on Computer Architecture, pp. 203–212, May 1996.

Song P., "Multithreading Comes of Age", Microdesign Resources, Microprocessor Report, pp. 13–18, Jul. 14, 1997.

Dongarra, Jack J., "A Survey of High Performance Computers", U.S. Government Work, pp. 8–11 (Jan. 10, 1986).

Iannucci, Robert A., "Two Fundamental Issues in Multiprocessing", Laboratory for Computer Science, Massachusetts Institute of Technology, Proceeding of the DFVLR Conference, pp. 61–88 (Jun. 25–29, 1987).

Kuck, David J., "The Burroughs Scientific Processor (BSP)", IEEE Transactions on Computers, vol. C–31, No. 5, pp. 363–376 (May 1982).

(List continued on next page.)

*Primary Examiner*—Daniel H. Pan
*Attorney, Agent, or Firm*—Karuna Ojanen

[57] ABSTRACT

A system and method for performing computer processing operations in a data processing system includes a multithreaded processor and thread switch logic. The multithreaded processor is capable of switching between two or more threads of instructions which can be independently executed. Each thread has a corresponding state in a thread state register depending on its execution status. The thread switch logic contains a thread switch control register to store the conditions upon which a thread will occur. The thread switch logic has a time-out register which forces a thread switch when execution of the active thread in the multithreaded processor exceeds a programmable period of time. Thread switch logic also has a forward progress count register to prevent repetitive thread switching between threads in the multithreaded processor. Thread switch logic also is responsive to a software manager capable of changing the priority of the different threads and thus superseding thread switch events.

17 Claims, 7 Drawing Sheets

U.S. PATENT DOCUMENTS

| | | | |
|---|---|---|---|
| 3,980,991 | 9/1976 | Mercurio | 340/172.5 |
| 3,980,992 | 9/1976 | Levy et al. | 340/172.5 |
| 4,047,161 | 9/1977 | Davis | 364/200 |
| 4,084,228 | 4/1978 | Dufond et al. | 364/200 |
| 4,229,790 | 10/1980 | Gilliland et al. | 364/200 |
| 4,320,453 | 3/1982 | Roberts et al. | 364/200 |
| 4,384,324 | 5/1983 | Kim et al. | 364/200 |
| 4,493,020 | 1/1985 | Kim et al. | 364/200 |
| 4,532,587 | 7/1985 | Roskell et al. | 364/200 |
| 4,590,555 | 5/1986 | Bourrez | 364/200 |
| 4,692,861 | 9/1987 | May | 364/200 |
| 4,704,678 | 11/1987 | May | 364/200 |
| 4,829,425 | 5/1989 | Bain, Jr. et al. | 364/200 |
| 4,853,849 | 8/1989 | Bain, Jr. et al. | 364/200 |
| 5,050,070 | 9/1991 | Chastain et al. | 364/200 |
| 5,079,725 | 1/1992 | Geer et al. | 364/550 |
| 5,103,394 | 4/1992 | Blasciak | 395/575 |
| 5,148,536 | 9/1992 | Witek et al. | 395/425 |
| 5,159,686 | 10/1992 | Chastain et al. | 395/650 |
| 5,179,702 | 1/1993 | Spix et al. | 395/650 |
| 5,197,138 | 3/1993 | Hobbs et al. | 395/375 |
| 5,287,508 | 2/1994 | Hejna, Jr. et al. | 395/650 |
| 5,339,415 | 8/1994 | Strout, II et al. | 395/650 |
| 5,353,418 | 10/1994 | Nikhil et al. | 395/375 |
| 5,357,617 | 10/1994 | Davis et al. | 395/375 |
| 5,361,334 | 11/1994 | Cawley | 395/200 |
| 5,361,337 | 11/1994 | Okin | 395/375 |
| 5,404,469 | 4/1995 | Chung et al. | 395/375 |
| 5,408,671 | 4/1995 | Tanaka | 395/800 |
| 5,423,008 | 6/1995 | Young et al. | 395/325 |
| 5,430,850 | 7/1995 | Papadopoulos et al. | 395/375 |
| 5,471,593 | 11/1995 | Branigin | 395/375 |
| 5,490,272 | 2/1996 | Mathis et al. | 395/650 |
| 5,499,349 | 3/1996 | Nikhil et al. | 395/375 |
| 5,515,538 | 5/1996 | Kleiman | 395/733 |
| 5,530,866 | 6/1996 | Koblenz et al. | 395/700 |
| 5,535,361 | 7/1996 | Hirata et al. | 395/472 |
| 5,553,305 | 9/1996 | Gregor et al. | 395/836 |
| 5,574,939 | 11/1996 | Keckler et al. | 395/800.24 |
| 5,613,114 | 3/1997 | Anderson et al. | 395/678 |
| 5,630,128 | 5/1997 | Farrell et al. | 395/673 |
| 5,630,136 | 5/1997 | Davidson et al. | 395/676 |
| 5,694,603 | 12/1997 | Reiffin | 395/677 |
| 5,694,604 | 12/1997 | Reiffin | 395/677 |
| 5,826,081 | 10/1998 | Zolnowsky | 395/673 |

OTHER PUBLICATIONS

Thekkath, Radhika et al, "The Effectiveness of Multiple Hardware Contexts", Department of Computer Science and Engineering, FR–35, University of Washington, pp. 328–337 (1994).

Tomasulo, R. M., "An Efficient Algorithm for Exploiting Multiple Arithmetic Units", IBM Journal, pp. 25–33 (Jan. 1967).

Weber, Wolf–Dietrich et al, "Exploring the Benefits of Multiple Hardware Contexts in a Multiprocessor Architecture: Preliminary Results", The 16th Annual International Symposium on Computer Architecture, IEEE Computer Society Press, pp. 272–280 (1989).

Willis, Dr. John et al, "What is Data–driven, Multithreaded Architecture", IBM Technical Report TR07.2232, pp. 1–21 (Aug. 24, 1995).

Mike Johnson, "Superscalar Microprocessor Design," Prentice Hall, pp. 21, 46–47, 233–235, 268–272, 1991.

Bradley J. Kish and Bruno R. Preiss, "Hobbes: A Multi–Threaded Superscalar Architecture," University of Waterloo, 1994.

Howe's Free On–Line Dictionary of Computing (http://www.instantweb.com/foldoc/), background, foreground, Oct. 1994.

Bernard Karl Gunther, "Superscalar Performance in a Multithreaded Microprocessor," University of Tasmania Hobart, Chapters 2 and 3, Dec. 1993.

Aschenbrenner, R. et al, "Intrinsic Multiprocessing", AFIPS Conference Proceedings, vol. 30, 1967 Spring Joint Computer Conference, pp. 81–86.

Hatch, T. F. Jr. et al, "Hardware/Software Interaction on the Honeywell Model 8200", AFIPS Confe: Proceedings, vol. 33, Part 1, 1968, Fall Joint Computer Conference, pp. 891–901.

Foster, C. C., "Uncoupling Central Processor and Storage Device Speeds", The Computer Journal, vol. 14, No. 1, pp. 45–48.

Anderson, D. W. et al, The IBM System/360 Model 91: Machine Philosophy and Instruction–Handling IBM Journal of Research and Development, vol. 11, 1967, pp. 8–24.

Cook, Robert W. et al, "System Design of a Dynamic Microprocessor", IEEE Transactions on Compute: vol. C–19, No. 3, Mar. 1970, pp. 213–222.

Cull, Thomas C., The Honeywell 8200', Datamation, vol. 11, No. 7, Jul. 1965, pp. 90–91.

Nisenoff, N., "Scratchpad Memories at Honeywell: Past, Present, and Future", AFIPS Conference Proceedings, vol. 27, Part 1, 1965, Fall Joint Computer Conference, pp. 679–688.

"Honeywell 800 System", from the collecitons of the Univeristy of Toledo Libraries, pp. 0–42.

Dreyfus, P., "Programming Design Features of the GAMMA 60 Computer", Proceedings of the Eastern Joint Computer Conference, Dec. 3–5, 1958, pp. 174–181.

Miller, Edward F. Jr., "A Multiple–Stream Registerless Shared–Resource Processor", IEEE Transactions on Computers, vol. C–23, No. 3, Mar. 1974, pp. 277–285.

Culler, Arvind and David E., "Dataflow Architectures", Annual Review Computer Science, 1986, pp. 225–253.

Buehrer, Richard et al, "Incorporating Data Flow Ideas into von Neumann Processors for Parallel Execution", IEEE Transactions on Computers, vol. C–36, No. 12, Dec. 1987, pp. 1515–1522.

Halstead, Robert H. Jr. et al, "MASA: A Multithreaded Processor Architecture for Parallel Symbolic Computing", 15th Annual International Symposium on Computer Architecture, 1988, pp. 443–451.

Agarwal, A. et al, "APRIL: A Processor Architecture for Multiprocessing", Proceedings of the 17th Annual Symposium on Computer Architecture, May 1990, pp. 104–114.

Agarwal, A., "Analysis of Cache Performance for Operating Systems and Multiprogramming", Dissertation Abstracts International, vol. 48, No. 7, Jan. 1988, pp. 2024–B.

Dally, William J. et al, "Architecture of a Message–Driven Processor", 14th Annual International Symposium on Computer Architecture, Jun. 1987, pp. 189–196.

Arvind et al, "A Critique of Multiprocessing von Neumann Style", Proceedings of the 10th ACM International Symposium on Computer Architecture, Jun. 1983, pp. 426–436.

Flynn, Michael J. et al, "An Unconventional Computer Architecture: Shared Resource Multiprocessing", Computer, Mar./Apr. 1972, pp. 20–28.

Shar, Leonard E. et al, "A Multiminiprocessor System Implemented Through Pipelining", Computer, Feb. 1974, pp. 42–51.

Kaminski, W. J. et al, "Developing a Multiple–Instruction–Stream Single–Chip Processor", Computer, Dec. 1979, pp. 66–76.

Konsek, Marian B. et al, "Context Switching With Multiple Register Windows: A RISC Performance Study", Stanford Technical Report No. UIUCDCS–R–87–1377, Oct. 1987, pp. 0–32.

Kishi, Masasuke et al, "DDDP: A Distributed Data Driven Processor", Proceedings of 10th International Symposium on Computer Architecture, 1983, pp. 236–242.

Ohr, Stephen "RISC Machines", Electronic Design, vol. 33, Jan. 10, 1985, pp. 174–190.

Ragan–Kelley, Robert et al, "Applying RISC Theory to a Large Computer", Computer Design, vol. 22, No. 13, Nov. 1983, pp. 191–198.

Mayhew, David et al, "Overlapping Register Windows with Transparent Spill and In–Line Subroutine Expansion", Conference Proceedings IEEE Southeastcon '87, Apr. 1987, pp. 627–630.

Markoff, John "RISC Chips—RISC Means Longer Programs but Faster Execution", BYTE, vol. 9, No. 12, Dec. 1984, pp. 191–206.

Seitz, Charles L., "The Cosmic Cube", Communications of the ACM, vol. 28, No. 1, Jan. 1985, pp. 22–33.

Smith, Bob "Chips in Transition", PC Tech Journal, vol. 4, No. 4, Apr. 1986, pp. 56–63.

Kuehn, James T. et al, "The Horizon Supercomputing System: Architecture and Software", Proceedings of Supercomputing '88, pp. 28–34.

Snelling, David F. et al, "MIMD Processing and the Denelcor HEP", Multiprocessing in Meterorological Models, Springer–Verlag, pp. 89–95.

Willis, I. C. et al, "RapidGraph: An Object Flow Multiprocessor", Proceedings of the International Workshop on Programming Environments for Intelligent Systems, 1985.

Whitby–Strevens, Colin "The Transputer", IEEE Proceedings of 12th Annual International Symposium Computer Architecture, Jun. 1985, pp. 292–300.

Smith, Burton J. et al, Architecture and Applications of the HEP Multiprocessor Computer System, Proceedings of the Conference on Peripheral Array Processors, Oct. 1982, pp. 159–170.

Smith, Burton J. "Architecture and Applications of the HEP Multiprocessor Computer System", Proceedings of SPIE—The Int'l. Society for Optical Engineering, vo. 298, Aug. 1981, pp. 241–248.

Smith, Burton J. "A Pipelined, Shared Resource MIMD Computer", Proceedings of the 1978 Int'l. Conference on Parallel Processing, Aug. 1978, pp. 6–8.

Thistle, Mark R. et al, "A Processor Architecture for Horizon", IEEE Supercomputing '88, pp. 35–41.

Okamoto, Kazuaki et al, "Multithread Execution Mechanisms on RICA–1 for Massively Parallel Computation", Proceedings of the 1996 Conference on Parallel Architectures and Compilation Techniques (PACT '96), pp. 116–121.

Hofmann, Rick "Dual–Port Register File with Overlapped Register Windowing", IBM Technical Report TR54.660, Apr. 20, 1992, pp. 0–37.

Ghose, Kanad et al, "Using Method Lookup Caches and Register Windowing to Speed Up Dynamically–Bound Object–Oriented Applications", Proceedings of the 22nd EUROMICRO Conference, EUROMICRO 96, pp. 441–448.

Hidaka, Yasuo et al, "Multiple Threads in Cyclic Register Windows", Proceedings of the 20th Annual Int'l. Symposium on Computer Architecture, May 1993, pp. 131–142.

Topham, Nigel P. et al, "Context Flow: An Alternative to Conventional Pipelined Architectures", The Journal of Supercomputing, vol. 2, No. 1, 1988, pp. 29–53.

Athas, William C. et al, "Multicomputers: Message–Passing Concurrent Computers", Computer, vol. 21, No. 8, Aug. 1988, pp. 9–24.

Wallich, Paul "Toward Simpler, Faster Computers", IEEE Spectrum, vol. 22, No. 8, Aug. 8, 1985, pp. 38–45.

Cheng, Ching Yuang et al, "RPM: A Fast RISC Type Prolog Machine", Proceedings VLSI and Computers, First Int'l. Conference onComputer Technology, Systems and Applications, Hamburg, May 11–15, 1987.

Chang, Yen et al, "Use Structured Arrays for High–Performance Data Processing", Electronic Design News, vol. 32, No. 8, Apr. 1987, pp. 177–184.

Wilson, Ron "Higher Speeds Push Embedded Systems to Multiprocessing", Computer Design, Jul. 1, 1989, pp. 72–83.

Sporer, Michael et al, "An Introduction to the Architecture of the Stellar Graphics Supercomputer", Proceedings of Compcon Spring '88, 33rd IEEE Computer Society Int'l. Conference, pp. 464–467.

Lorin, Harold "Introduction to Computer Architecture and Organization", A Wiley–Interscience Publication, John Wiley & Sons, pp. 41–53.

Fujita, Tetsuya "A Multithreaded Processor Architecture for Parallel Symbolic Computation", MIT Laboratory for Computer Science, MIT/LCS/TM–338, Sep. 1987, pp. 0–71.

"Sigma 7", Scientific Data Systems, pp. 0–24.

"Sigma 7 in the News", Scientific Data Systems, pp. 0–27.

"SDS Sigma 7 Computer Reference Manual", Scientific Data Systems, May 1966, pp. 0–95.

"Sigma 7", Scientific Data Systems, pp. 0–21.

Papadopoulos, Gregory M., "Implementation of a General Purpose Dataflow Multiprocessor", MIT Electrical Engineering and Computer Science PHD Thesis, Aug. 1988, pp. 0–155.

Thornton, J. E., "Design of a Computer—The Control Data 6600", Scott, Foresman and Company, 1970, pp. 115–175.

IBM Technical Disclosure Bulletin, vol. 38, No. 5, May 1995, pp. 271–276, "Deterministic Priority Inversion Method for Personal Computers".

IBM Technical Disclosure Bulletin, vol. 33, No. 9, Feb. 1991, pp. 446–447, "Generic Unix Off–Level Interrupt Handling Invocation Algorithm".

IBM Technical Disclosure Bulletin, vol. 38, No. 9, Sep. 1995, pp. 563–565, "Deadline Monotonic Server".

Weinberg, William; Posix, Real–Time Magazine 97–2, pp. 51–54, "Meeting Real–Time Performance Goals With Kernel Threads".

Atwood, J. William; Computer Magazine, Oct. 1976, pp. 18–26, "Concurrency in Operating Systems".

Tokuda, Hideyuki et al; IEEE, 1989, pp. 348–359, "Priority Inversions in Real–Time Communication".

Inohara, Shigekazu et al; IEEE, 1993, pp. 149–155, "Unstable Threads Kernel Interface for Minimizing the Overhead of Thread Switching".

Bolychevsky, A. et al; IEE Proc–Computer Digit Tech, vol. 143, No. 5, Sep. 1996, pp. 309–317, "Dynamic Scheduling in RISC Architectures".

Dubey, Pradeep K. et al; IEEE, 1995, pp. 110–122, "Analytic Performance Modeling for a Spectrum of Multithreaded Processor Architectures".

METHOD AND APPARATUS TO FORCE A THREAD SWITCH IN A MULTITHREADED PROCESSOR

RELATED APPLICATION DATA

The present invention relates to the following U.S. applications, the subject matter of which is hereby incorporated by reference: (1) U.S. Ser. No. 08/958,716 filed Oct. 23, 1997 entitled *Method and Apparatus for Selecting Thread Switch Events in a Multithreaded Processor*, filed concurrently herewith; (2) U.S. Ser. No. 08/956,875 filed Oct. 23, 1997 entitled *An Apparatus and Method to Guarantee Forward Progress in a Multithreaded Processor*, filed concurrently herewith; (3) U.S. Ser. No. 08/958,718 filed Oct. 23, 1997 entitled *Altering Thread Priorities in a Multithreaded Processor*, filed concurrently herewith; (4) U.S. Ser. No. 08/957,002 filed Oct. 23, 1997 entitled *Thread Switch Control in a Multithreaded Processor System*, filed concurrently herewith; (5) U.S. Ser. No. 08/773,572 filed Dec. 27, 1996 entitled *Background Completion of Instruction and Associated Fetch Request in a Multithread Processor*; (6) U.S. Ser. No. 08/761,378 filed Dec. 09, 1996 entitled *Multi-Entry Fully Associative Transition Cache*; (7) U.S. Ser. No. 08/761,380 filed Dec. 09, 1996 entitled *Method and Apparatus for Prioritizing and Routing Commands from a Command Source to a Command Sink*, (9) U.S. Ser. No. 08/761,379 filed Dec. 09, 1996 entitled *Method and Apparatus for Tracking Processing of a Command*; and (9) U.S. Ser. No. 08/473,692 filed Jun. 7, 1995 entitled *Method and System for Enhanced Multithread Operation in a Data Processing System by Reducing Memory Access Latency Delays*, now abandoned.

BACKGROUND OF THE INVENTION

The present invention relates in general to an improved method for and apparatus of a computer data processing system; and in particular, to an improved high performance multithreaded computer data processing system and method embodied in the hardware of the processor.

The fundamental structure of a modern computer includes peripheral devices to communicate information to and from the outside world; such peripheral devices may be keyboards, monitors, tape drives, communication lines coupled to a network, etc. Also included in the basic structure of the computer is the hardware necessary to receive, process, and deliver this information from and to the outside world, including busses, memory units, input/output (I/O) controllers, storage devices, and at least one central processing unit (CPU), etc. The CPU is the brain of the system. It executes the instructions which comprise a computer program and directs the operation of the other system components.

From the standpoint of the computer's hardware, most systems operate in fundamentally the same manner. Processors actually perform very simple operations quickly, such as arithmetic, logical comparisons, and movement of data from one location to another. Programs which direct a computer to perform massive numbers of these simple operations give the illusion that the computer is doing something sophisticated. What is perceived by the user as a new or improved capability of a computer system, however, may actually be the machine performing the same simple operations, but much faster. Therefore continuing improvements to computer systems require that these systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. So that if everything runs twice as fast but otherwise works in exactly the same manner, the system will perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. Designer, however, think that physical size reductions cannot continue indefinitely and there are limits to continually increasing processor clock speeds. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. The use of slave processors considerably improves system speed by off-loading work from the CPU to the slave processor. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously. It is much more difficult, however, to improve the speed at which a single task, such as an application program, executes. Coordinating the execution and delivery of results of various functions among multiple CPUs is a tricky business. For slave I/O processors this is not so difficult because the functions are pre-defined and limited but for multiple CPUs executing general purpose application programs it is much more difficult to coordinate functions because, in part, system designers do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial transactions which are not necessarily repetitive or predictable.

Thus, while multiple processors improve overall system performance, there are still many reasons to improve the speed of the individual CPU. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly mentioned earlier. As semiconductor technology has advanced, the goal of RISC architecture has been to develop processors capable of executing one or more instructions on each clock cycle of the machine. Another approach to increase the average number of operations executed per clock cycle is to modify the hardware within the CPU. This throughput measure, clock cycles per instruction, is commonly used to characterize architectures for high performance processors. Instruction pipelining and cache memories are computer architectural features that have made this achievement possible. Pipeline instruction execution allows subsequent instructions to begin execution before previously issued instructions have finished. Cache memories store frequently used and other data nearer the processor and allow instruction execution to continue, in most cases, without waiting the full access time of a main memory. Some improvement has also been demonstrated with multiple execution units with look ahead hardware for finding instructions to execute in parallel.

The performance of a conventional RISC processor can be further increased in the superscalar computer and the Very Long Instruction Word (VLIW) computer, both of which execute more than one instruction in parallel per processor cycle. In these architectures, multiple functional or execution units are provided to run multiple pipelines in parallel. In a superscalar architecture, instructions may be completed in-order and out- of-order. In-order completion means no instruction can complete before all instructions dispatched ahead of it have been completed. Out-of-order completion means that an instruction is allowed to complete before all instructions ahead of it have been completed, as long as a predefined rules are satisfied.

For both in-order and out-of-order execution in superscalar systems, pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses and these memory access delays use an increasing proportion of processor execution time.

And yet another technique to improve the efficiency of hardware within the CPU is to divide a processing task into independently executable sequences of instructions called threads. This technique is related to breaking a larger task into smaller tasks for independent execution by different processors except here the threads are to be executed by the same processor. When a CPU then, for any of a number of reasons, cannot continue the processing or execution of one of these threads, the CPU switches to and executes another thread. This is the subject of the invention described herein which incorporates hardware multithreading to tolerate memory latency. The term "multithreading" as defined in the computer architecture community is not the same as the software use of the term which means one task subdivided into multiple related threads. In the architecture definition, the threads may be independent. Therefore "hardware multithreading" is often used to distinguish the two uses of the term. The present invention incorporates the term multithreading to connote hardware multithreading.

Multithreading permits the processors' pipeline(s) to do useful work on different threads when a pipeline stall condition is detected for the current thread. Multithreading also permits processors implementing non-pipeline architectures to do useful work for a separate thread when a stall condition is detected for a current thread. There are two basic forms of multithreading. A traditional form is to keep N threads, or states, in the processor and interleave the threads on a cycle-by-cycle basis. This eliminates all pipeline dependencies because instructions in a single thread are separated. The other form of multithreading, and the one considered by the present invention, is to interleave the threads on some long-latency event.

Traditional forms of multithreading involves replicating the processor registers for each thread. For instance, for a processor implementing the architecture sold under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated. Fortunately, there is no need to replicate some of the larger functions of the processor such as: level one instruction cache (L1 I-cache), level one data cache (L1 D-cache), instruction buffer, store queue, instruction dispatcher, functional or execution units, pipelines, translation lookaside buffer (TLB), and branch history table. When one thread encounters a delay, the processor rapidly switches to another thread. The execution of this thread overlaps with the memory delay on the first thread.

Existing multithreading techniques describe switching threads on a cache miss or a memory reference. A primary example of this technique may be reviewed in "Spardle: An Evolutionary Design for Large-Scale Multiprocessors," by Agarwal et al., IEEE Micro Volume 13, No. 3, pp. 48–60, Jun. 1993. As applied in a RISC architecture, multiple register sets normally utilized to support function calls are modified to maintain multiple threads. Eight overlapping register windows are modified to become four non-overlapping register sets, wherein each register set is a reserve for trap and message handling. This system discloses a thread switch which occurs on each first level cache miss that results in a remote memory request. While this system represents an advance in the art, modem processor designs often utilize a multiple level cache or high speed memory which is attached to the processor. The processor system utilizes some well-known algorithm to decide what portion of its main memory store will be loaded within each level of cache and thus, each time a memory reference occurs which is not present within the first level of cache the processor must attempt to obtain that memory reference from a second or higher level of cache.

It should thus be apparent that a need exists for an improved data processing system which can reduce delays due to memory latency in a multilevel cache system utilized in conjunction with a multithread data processing system.

SUMMARY OF TIRE INVENTION

An object of the present invention is to provide an improved data processing system and method for multi-threaded processing embodied in the hardware of the processor. This object is achieved by a multithreaded processor capable of switching execution between two threads of instructions, and thread switch logic embodied in hardware registers with optional software override of thread switch conditions. An added advantage of the thread switch logic is that processing of various threads of instructions allows optimization of the use of the processor among the threads.

Another object of the present invention is to improve multithreaded computer processing by allowing the processor to execute a second thread of instructions thereby increasing processor utilization which is otherwise idle because it is retrieving necessary data and/or instructions from various memory elements, such as caches, memories, external I/O, direct access storage device for a first thread. An additional object of the present invention is to provide a multithread data processing system and method which performs conditional thread switching wherein the conditions of thread switching can be different per thread or can be changed during processing by the use of a software thread control manager.

is yet another object to prevent processing of a background thread from being inactive for an excessive period of time. A thread switch is forced after an active thread has been executing for a number of cycles specified in a thread switch time-out register. Thus, the computer processing system does not experience hangs resulting from shared resource contention. Processor cycles are fairly allocated between threads and the maximum response latency to external interrupts and events external to the processor is limited.

These and other objects of the invention are achieved by computer processor having a multithreaded processor capable of switching between at least two threads of instructions in which at least one of the threads is an active thread executing instructions in the multithreaded processor. The invention also has a time-out counter which counts the number of cycles that the active thread executes, and a time-out register operatively connected to the multithreaded processor and having a predetermined number which generates a time-out signal when the time-out counter equals the predetermined number in the time-out register. In addition, a thread switch controller may send a switch signal to the multithreaded processor in response to the time-out signal and force the multithreaded processor to switch to another thread. In this fashion, the domination of the processor's resources by one thread is prevented and the resources can be programmed to be shared by the different threads.

The invention is also a method of computer processing, comprising setting a first time-out value in a first time-out register, executing a first thread of instructions in a multi-threaded processor, resetting a first time-out counter when a thread switch occurs to the first thread, incrementing the first time-out counter every period the first thread executes, sending a first time-out signal to a thread switch controller when the first time-out register is equivalent to the first time-out value. Then, if there are no other intervening controls, the thread switch controller sends a first-time out signal to switch execution to the background thread. In addition, the processor may have a second time-out register for a second thread which may have a different time-out value than the first time-out value. In any event, the time-out values can be gaged to be longer than the most frequent longest latency period in which the threads are inactive, such as accessing main memory. The invention also comprises a method of setting a second time-out value, resetting a second time-out counter when a thread switch occurs to a second thread, incrementing the second time-out counter every time period the second thread executes, then sending a second time-out signal to the thread switch controller when the second time-out register is equivalent to the second time-out value. Again, if no other thread switch control signals intervene, the method further comprises switching execution to a thread other than the second thread in response to the second time-out signal.

Other objects, features and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The invention itself, however, as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENTS

Figure 1:
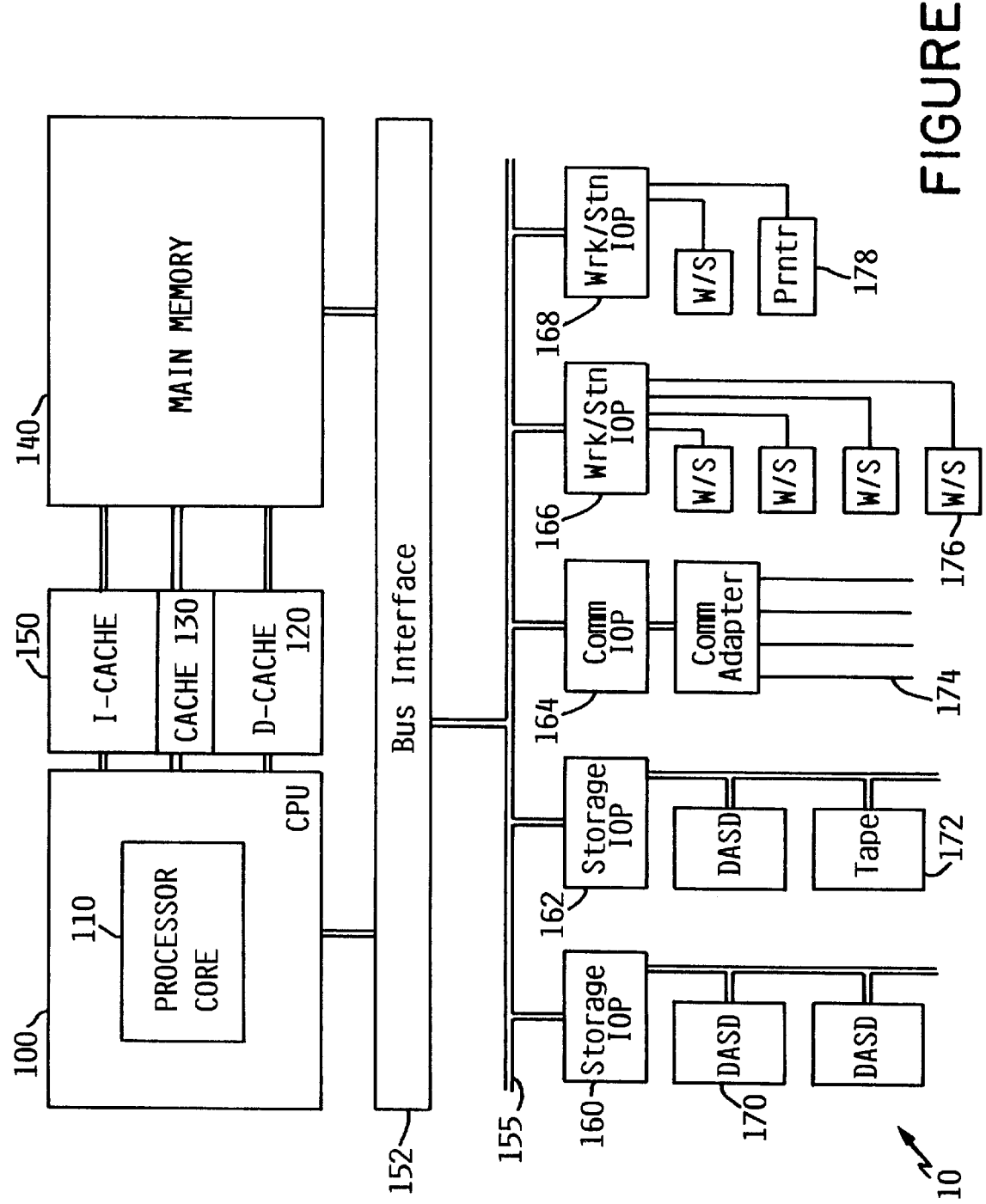
FIG. 1 is a block diagram of a computer system capable of implementing the invention described herein.

With reference now to the figures and in particular with reference to FIG. 1, there is depicted a high level block diagram of a computer data processing system 10 which may be utilized to implement the method and system of the present invention. The primary hardware components and interconnections of a computer data processing system 10 capable of utilizing the present invention are shown in FIG. 1. Central processing unit (CPU) 100 for processing instructions is coupled to caches 120, 130, and 150. Instruction cache 150 stores instructions for execution by CPU 100. Data caches 120, 130 store data to be used by CPU 100. The caches communicate with random access memory in main memory 140. CPU 100 and main memory 140 also communicate via bus interface 152 with system bus 155. Various input/output processors (IOPs) 160–168 attach to system bus 155 and support communication with a variety of storage and input/output (I/O) devices, such as direct access storage devices (DASD) 170, tape drives 172, remote communication lines 174, workstations 176, and printers 178. It should be understood that FIG. 1 is intended to depict representative components of a computer data processing system 10 at a high level, and that the number and types of such components may vary.

Figure 2:
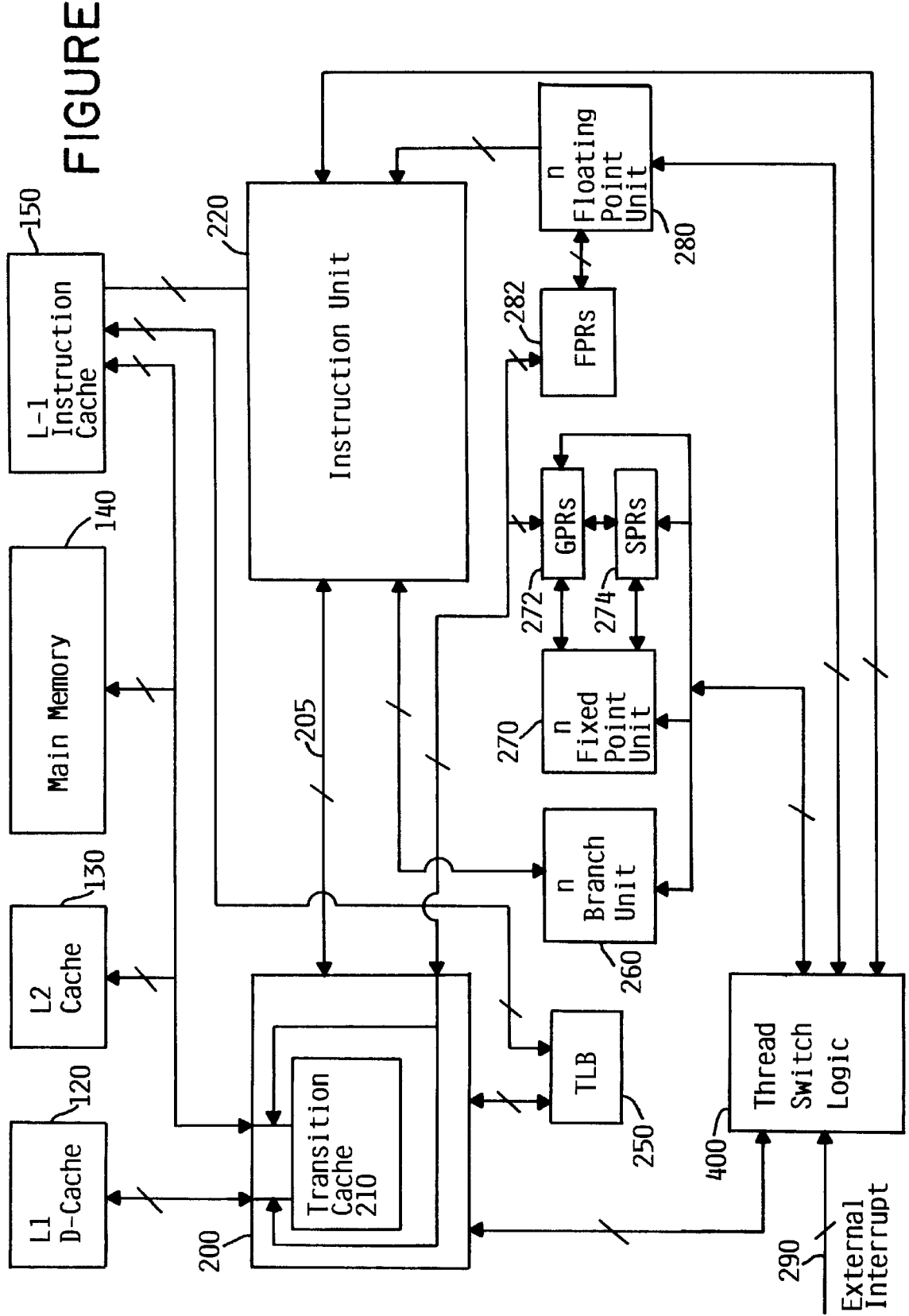
FIG. 2 illustrates a high level block diagram of a multi-threaded data processing system according to the present invention.

Within the CPU 100, a processor core 110 contains specialized functional units, each of which perform primitive operations, such as sequencing instructions, executing operations involving integers, executing operations involving real numbers, transferring values between addressable storage and logical register arrays. FIG. 2 illustrates a processor core 100. In a preferred embodiment, the processor core 100 of the data processing system 10 is a single integrated circuit, pipelined, superscalar microprocessor, which may be implemented utilizing any computer architecture such as the family of RISC processors sold under the trade name PowerPC™, for example, the PowerPC™ 604 microprocessor chip sold by IBM.

As will be discussed below, the data processing system 10 preferably includes various units, registers, buffers, memories, and other sections which are all preferably formed by integrated circuitry. It should be understood that in the figures, the various data paths have been simplified; in reality, there are many separate and parallel data paths into and out of the various components. In addition, various components not germane to the invention described herein have been omitted, but it is to be understood that processors contain additional units for additional functions. The data processing system 10 can operate according to reduced instruction set computing, RISC, techniques or other computing techniques.

As represented in FIG. 2, the processor core 100 of the data processing system 10 preferably includes a level one data cache, L1 D-cache 120, a level two L2 cache 130, a main memory 140, and a level one instruction cache, L1 I-cache 150, all of which are operationally interconnected utilizing various bus connections to a storage control unit 200. As shown in FIG. 1, the storage control unit 200 includes a transition cache 210 for interconnecting the L1 D-cache 120 and the L2 cache 130, the main memory 140, and a plurality of execution units. The L1 D-cache 120 and L1 I-cache 150 preferably are provided on chip as part of the processor 100 while the main memory 140 and the L2 cache 130 are provided off chip. Memory system 140 is intended to represent random access main memory which may or may not be within the processor core 100 and, and other data buffers and caches, if any, external to the processor core 100, and other external memory, for example, DASD 170, tape drives 172, and workstations 176, shown in FIG. 1. The L2 cache 130 is preferably a higher speed memory system than the main memory 140, and by storing selected data within the L2 cache 130, the memory latency which occurs as a result of a reference to the main memory 140 can be minimized. As shown in FIG. 1, the L2 cache 130 and the main memory 140 are directly connected to both the L1 I-cache 150 and an instruction unit 220 via the storage control unit 200.

Instructions from the L1 I-cache 150 are preferably output to an instruction unit 220 which, in accordance with the method and system of the present invention, controls the execution of multiple threads by the various subprocessor units, e.g., branch unit 260, fixed point unit 270, storage control unit 200, and floating point unit 280 and others as specified by the architecture of the data processing system 10. In addition to the various execution units depicted within FIG. 1, those skilled in the art will appreciate that modern superscalar microprocessor systems often include multiple versions of each such execution unit which may be added without departing from the spirit and scope of the present invention. Most of these units will have as an input source operand information from various registers such as general purpose registers GPRs 272, and floating point registers FPRs 282. Additionally, multiple special purpose register SPRs 274 may be utilized. As shown in FIG. 1, the storage control unit 200 and the transition cache 210 are directly connected to general purpose registers 272 and the floating point registers 282. The general purpose registers 272 are connected to the special purpose registers 274.

Among the functional hardware units unique to this multithreaded processor 100 is the thread switch logic 400 and the transition cache 210. The thread switch logic 400 contains various registers that determine which thread will be the active or the executing thread. Thread switch logic 400 is operationally connected to the storage control unit 200, the execution units 260, 270, and 280, and the instruction unit 220. The transition cache 210 within the storage control unit 200 must be capable of implementing multithreading. Preferably, the storage control unit 200 and the transition cache 210 permit at least one outstanding data request per thread. Thus, when a first thread is suspended in response to, for example, the occurrence of L1 D-cache miss, a second thread would be able to access the L1 D-cache 120 for data present therein. If the second thread also results in L1 D-cache miss, another data request will be issued and thus multiple data requests must be maintained within the storage control unit 200 and the transition cache 210. Preferably, transition cache 210 is the transition cache of U.S. application Ser. No. 08/761,378 filed Dec. 09, 1996 entitled *Multi-Entry Fully Associative Transition Cache*, hereby incorporated by reference. The storage control unit 200, the execution units 260, 270, and 280 and the instruction unit 220 are all operationally connected to the thread switch logic 400 which determines which thread to execute.

As illustrated in FIG. 2, a bus 205 is provided between the storage control unit 200 and the instruction unit 220 for communication of, e.g., data requests to the storage control unit 200, and a L2 cache 130 miss to the instruction unit 220. Further, a translation lookaside buffer TLB 250 is provided which contains virtual-to-real address mapping. Although not illustrated within the present invention various additional high level memory mapping buffers may be provided such as a segment lookaside buffer which will operate in a manner similar to the translation lookaside buffer 250.

Figure 3:
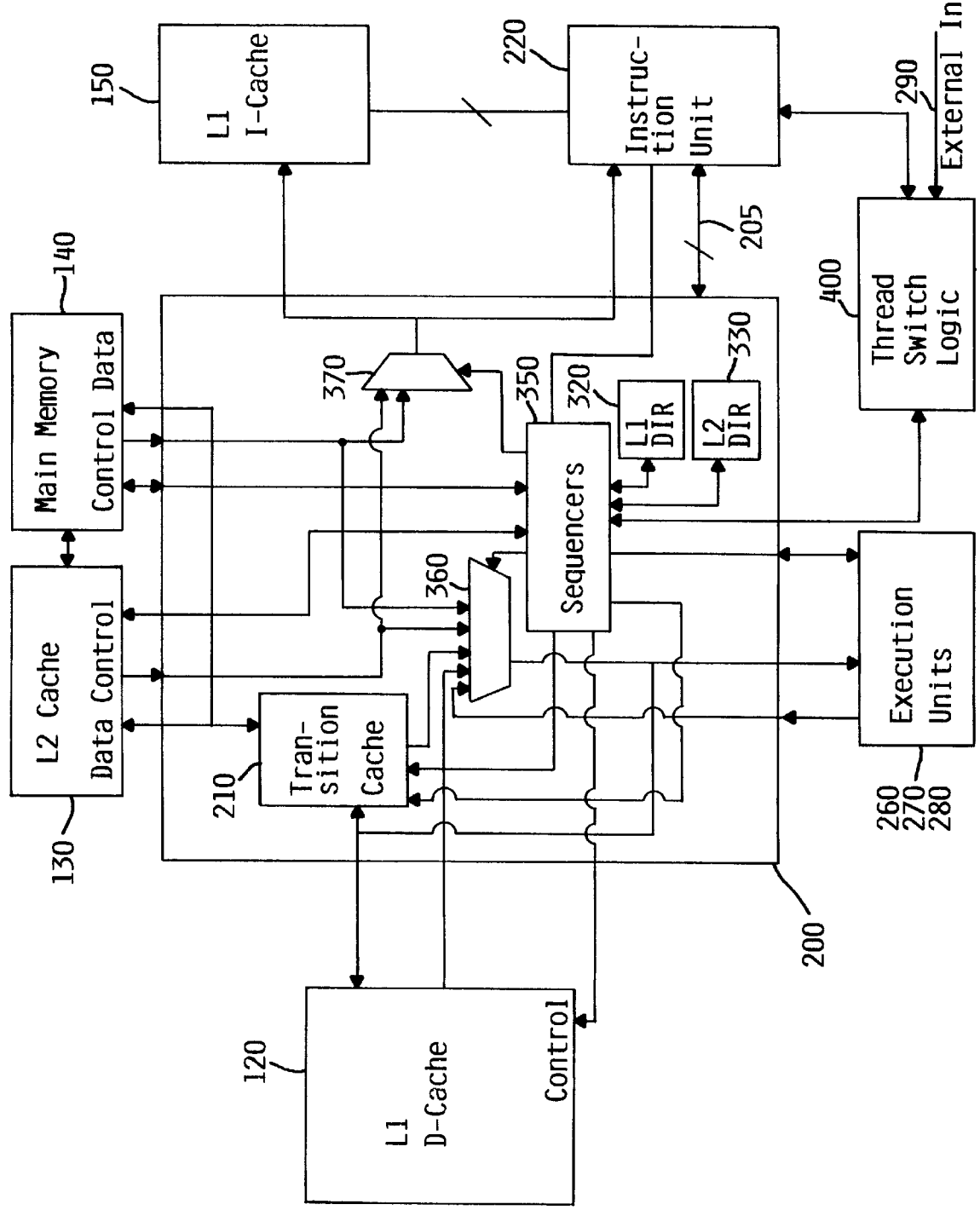
FIG. 3 illustrates a block diagram of the storage control unit of FIG. 2.

FIG. 3 illustrates the storage control unit 200 in greater detail, and, as the name implies, this unit controls the input and output of data and instructions from the various storage units, which include the various caches, buffers and main memory. As shown in FIG. 3, the storage control unit 200 includes the transition cache 210 functionally connected to the L1 D-cache 120, multiplexer 360, the L2 cache 130, and main memory 140. Furthermore, the transition cache 210 receives control signals from sequencers 350. The sequencers 350 include a plurality of sequencers, preferably three, for handling instruction and/or data fetch requests. Sequencers 350 also output control signals to the transition cache 210, the L2 cache 130, as well as receiving and transmitting control signals to and from the main memory 140.

Multiplexer 360 in the storage control unit 200 shown in FIG. 3 receives data from the L1 D-cache 120, the transition cache 210, the L2 cache 130, main memory 140, and, if data is to be stored to memory, the execution units 270 and 280.

Data from one of these sources is selected by the multiplexer 360 and is output to the L1 D-cache 120 or the execution units in response to a selection control signal received from the sequencers 350. Furthermore, as shown in FIG. 3, the sequencers 350 output a selection signal to control a second multiplexer 370. Based on this selection signal from the sequencers 350, the multiplexer 370 outputs the data from the L2 cache 130 or the main memory 140 to the L1 I-cache 150 or the instruction unit 220. In producing the above-discussed control and selection signals, the sequencers 350 access and update the L1 directory 320 for the L1 D-cache 120 and the L2 directory 330 for the L2 cache 130.

With respect to the multithreading capability of the processor described herein, sequencers 350 of the storage control unit 200 also output signals to thread switch logic 400 which indicate the state of data and instruction requests. So, feedback from the caches 120, 130 and 150, main memory 140, and the translation lookaside buffer 250 is routed to the sequencers 350 and is then communicated to thread switch logic 400 which may result in a thread switch, as discussed below. Note that any device wherein an event designed to cause a thread switch in a multithreaded processor occurs will be operationally connected to sequencers 350.

Figure 4A:
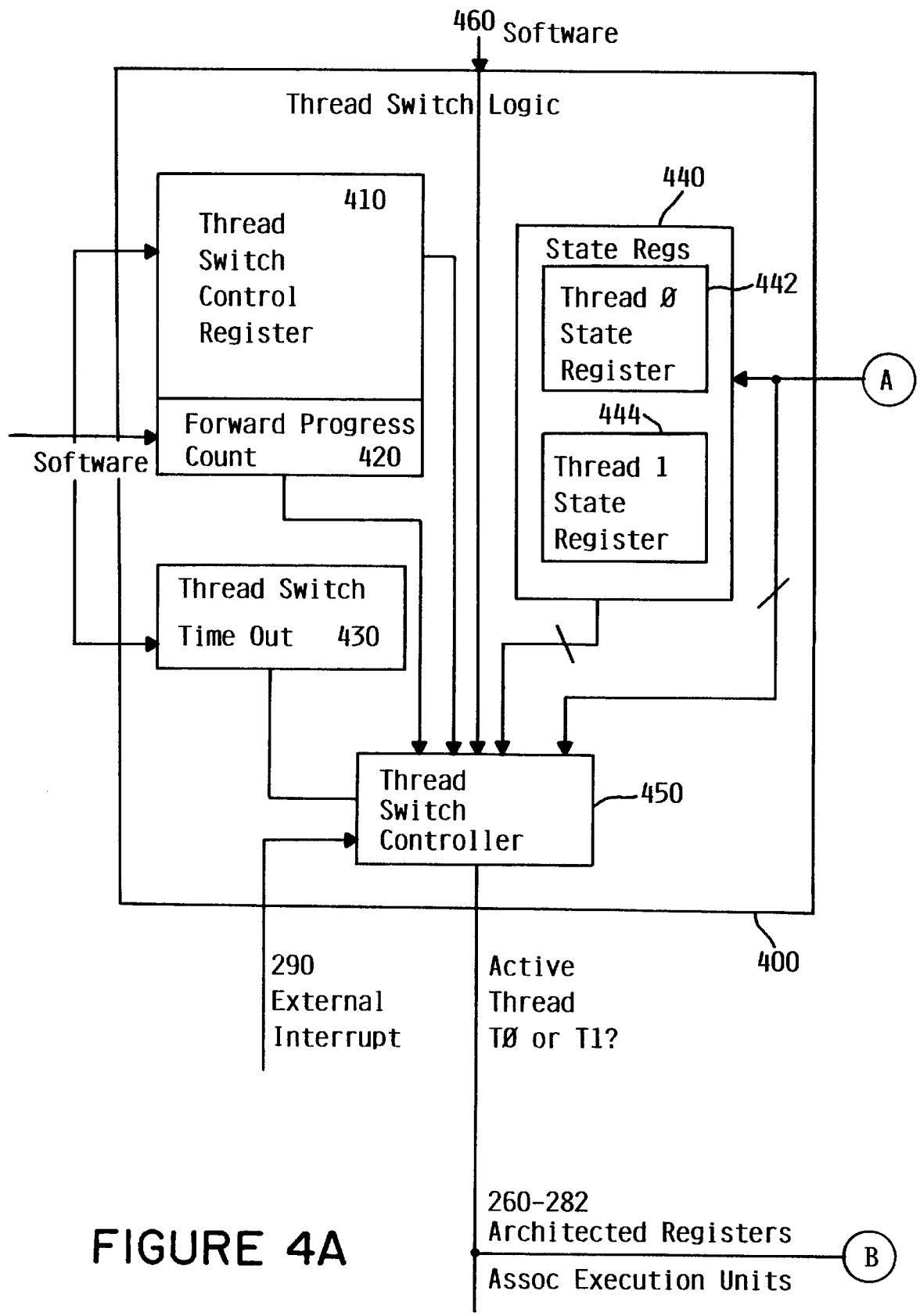
FIG. 4 illustrates a block diagram of the thread switch logic, the storage control unit and the instruction unit of FIG. 2.
Figure 4B:
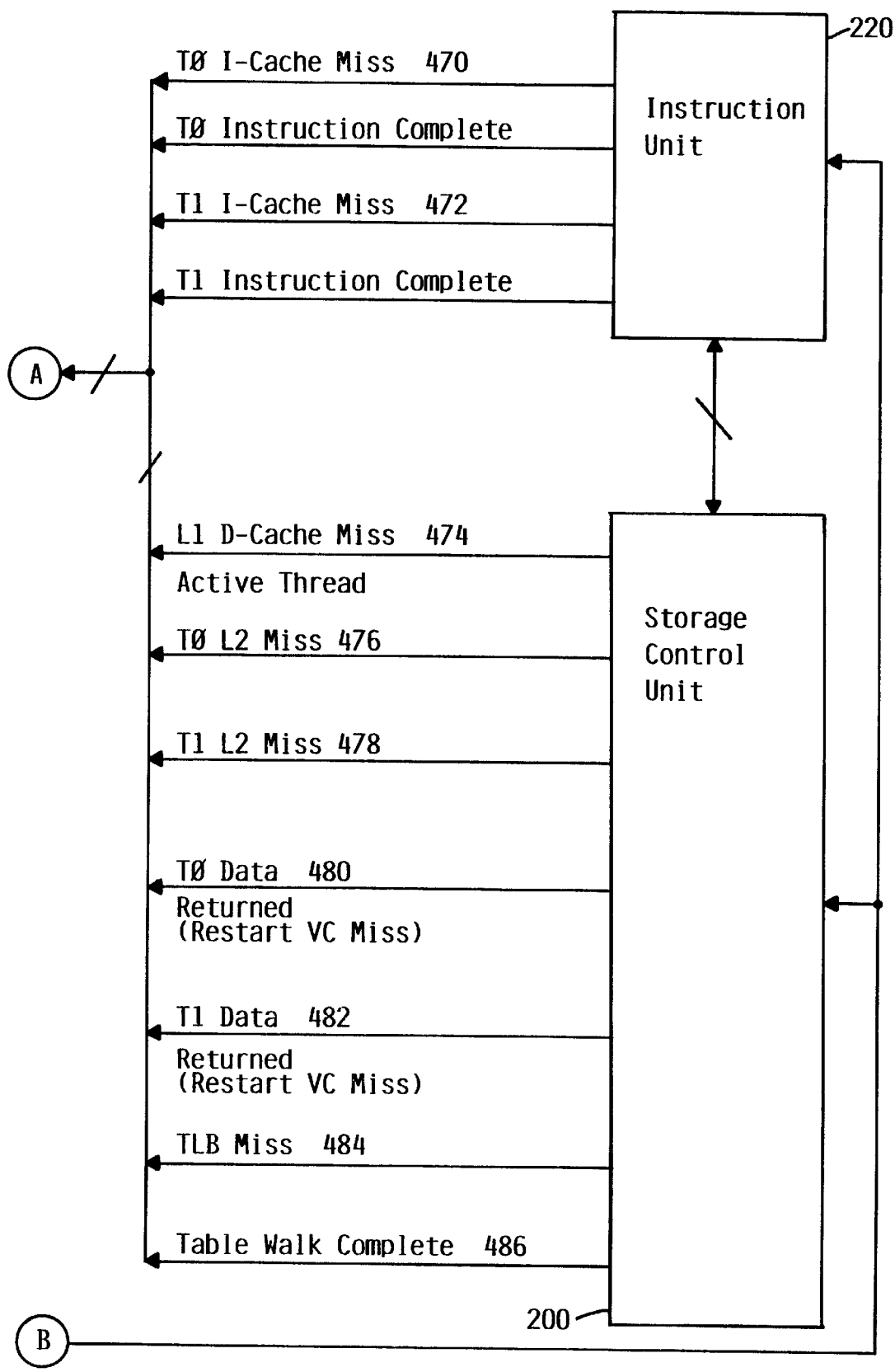

FIG. 4 is a logical representation and block diagram of the thread switch logic hardware 400 that determines whether a thread will be switched and, if so, what thread. Storage control unit 200 and instruction unit 220 are interconnected with thread switch logic 400. Thread switch logic 400 preferably is incorporated into the instruction unit 220 but if there are many threads the complexity of the thread switch logic 400 may increase so that the logic is external to the instruction unit 220. For ease of explanation, thread switch logic 400 is illustrated external to the instruction unit 220.

Some events which result in a thread to be switched in this embodiment are communicated on lines 470, 472, 474, 476, 478, 480, 482, 484, and 486 from the sequencers 350 of the storage control unit 200 to the thread switch logic 400. Other latency events can cause thread switching; this list is not intended to be inclusive; rather it is only representative of how the thread switching can be implemented. A request for an instruction by either the first thread T0 or the second thread T1 which is not in the instruction unit 220 is an event which can result in a thread switch, noted by 470 and 472 in FIG. 4, respectively. Line 474 indicates when the active thread, whether T0 or T1, experiences a L1 D-cache 120 miss. Cache misses of the L2 cache 130 for either thread T0 or T1 is noted at lines 476 and 478, respectively. Lines 480 and 482 are activated when data is returned for continued execution of the T0 thread or for the T1 thread, respectively. Translation lookaside buffer misses and completion of a table walk are indicated by lines 484 and 486, respectively.

These events are all fed into the thread switch logic 400 and more particularly to the thread state registers 440 and the thread switch controller 450. Thread switch logic 400 has one thread state register for each thread. In the embodiment described herein, two threads are represented so there is a T0 state register 442 for a first thread T0 and a T1 state register 444 for a second thread T1, to be described herein. Thread switch logic 400 comprises a thread switch control register 410 which controls what events will result in a thread switch. For instance, the thread switch control register 410 can block events that cause state changes from being seen by the thread switch controller 450 so that a thread may not be switched as a result of a blocked event. The thread switch control register 410 is the subject of a U.S. patent application Ser. No. 958,716 filed concurrently and herein incorporated by reference. The forward progress count register 420 is used to prevent thrashing and may be included in the thread switch control register 410. The forward progress count register 420 is the subject of a U.S. patent application Ser. No. 956,875 filed concurrently and herein incorporated by reference. The thread state registers and the logic and operation of changing threads are the subject of a U.S. patent application Ser. No. 957,002 filed concurrently and herein incorporated by reference. Also, thread priorities can be altered using software 460, the subject of a U.S. patent application Ser. No. 958,718 filed concurrently and herein incorporated by reference. Finally, but not to be limitative, the thread switch controller 450 comprises a myriad of logic gates which represents the culmination of all logic which actually determines whether a thread is switched, what thread, and under what circumstances. Each of these logic components and their functions are set forth in further detail.

Thread State Registers

Thread state registers 440 comprise a state register for each thread and, as the name suggests, store the state of the corresponding thread; in this case, a T0 thread state register 442 and a T1 thread state register 444. The number of bits and the allocation of particular bits to describe the state of each thread can be customized for a particular architecture and thread switch priority scheme. An example of the allocation of bits in the thread state registers 442, 444 for a multithreaded processor having two threads is set forth in the table below.

| Thread State Register Bit Allocation |
| --- |
| (0) Instruction/Data<br>　　0 = Instruction<br>　　1 = Data |
| (1:2) Miss type sequencer<br>　　00 = None<br>　　01 = Translation lookaside buffer miss (check bit 0 for I/D)<br>　　10 = L1 cache miss<br>　　11 = L2 cache miss |
| (3) Transition<br>　　0 = Transition to current state does not result in thread switch<br>　　1 = Transition to current state results in thread switch |
| (4:7) Reserved |
| (8) 0 = Load<br>　　1 = Store |
| (9:14) Reserved |
| (15:17) Forward progress counter<br>　　111 = Reset (instruction has completed during this thread)<br>　　000 = 1st execution of this thread w/o instruction complete<br>　　001 = 2nd execution of this thread w/o instruction complete<br>　　010 = 3rd execution of this thread w/o instruction complete<br>　　011 = 4th execution of this thread w/o instruction complete<br>　　100 = 5th execution of this thread w/o instruction complete |
| (18:19) Priority (could be set by software)<br>　　00 = Medium<br>　　01 = Low<br>　　10 = High<br>　　11 = <Illegal> |
| (20:31) Reserved |
| (32:63) Reserved if 64 bit implementation |

In the embodiment described herein, bit 0 identifies whether the miss or the reason the processor stalled execution is a result of a request for an instruction or for data. Bits 1 and 2 indicate if the requested information was not available and if so, from what hardware, i.e., whether the translated address of the data or instruction was not in the translation lookaside buffer 250, or the data or instruction itself was not in the L1 D-cache 120 or the L2 cache 130, as further explained in the description of FIG. 5. Bit 3 indicates whether the change of state of a thread results in a thread switch A thread may change state without resulting in a thread switch. For instance, if a thread switch occurs when thread T1 experiences an L1 cache miss, then if thread TJ experiences a L2 cache miss, there will be no thread switch because the thread already switched on a L1 cache miss. The state of T1, however, still changes. Alternatively, if by choice, the thread switch logic 400 is configured or programmed not to switch on a L1 cache miss, then when a thread does experience an L1 cache miss, there will be no thread switch even though the thread changes state. Bit 8 of the thread state registers 442 and 444 is assigned to whether the information requested by a particular thread is to be loaded into the processor core or stored from the processor core into cache or main memory. Bits 15 through 17 are allocated to prevent thrashing, as discussed later with reference to the forward progress count register 420. Bits 18 and 19 can be set in the hardware or could be set by software to indicate the priority of the thread.

Figure 5:
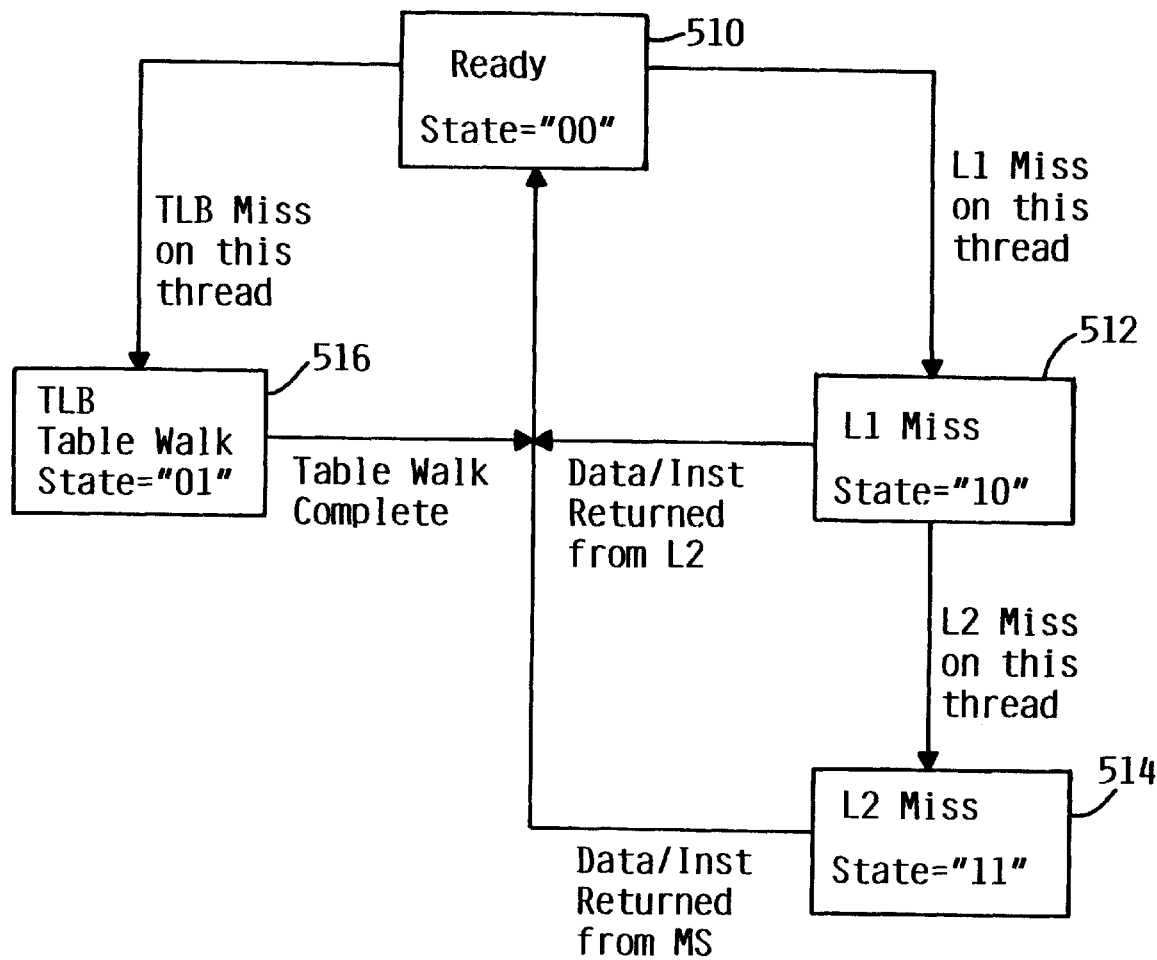
FIG. 5 illustrate the changes of state of a thread as the thread experiences different thread switch events shown in FIG. 4.

FIG. 5 represents four states in the present embodiment of a thread processed by the data processing system 10 and these states are stored in the thread state registers 440, bit positions 1:2. State 00 represents the "ready" state, i.e., the thread is ready for processing because all data and instructions required are available; state 10 represents the thread state wherein the execution of the thread within the processor is stalled because the thread is waiting for return of data into either the L1 D-cache 120 or the return of an instruction into the L1 I-cache 150; state 11 represents that the thread is waiting for return of data into the L2 cache 130; and the state 01 indicates that there is a miss on the translation lookaside buffer 250, i.e., the virtual address was in error or wasn't available, called a table walk. Also shown in FIG. 5 is the hierarchy of thread states wherein state 00, which indicates the thread is ready for execution, has the highest priority. Short latency events are preferably assigned a higher priority.

FIG. 5 also illustrates the change of states when data is retrieved from various sources. The normal uninterrupted execution of a thread T0 is represented in block 510 as state 00. If a L1 D-cache or I-cache miss occurs, the thread state changes to state 10, as represented in block 512, pursuant to a signal sent on line 474 (FIG. 4) from the storage control unit 200 or line 470 (FIG. 4) from the instruction unit 220, respectively. If the required data or instruction is in the L2 cache 130 and is retrieved, then normal execution of T0 resumes at block 510. Similarly block 514 of FIG. 5 represents a L2 cache miss which changes the state of thread of either T0 or T1 to state 11 when storage control unit 200 signals the miss on lines 476 or 478 (FIG. 4). When the instructions or data in the L2 cache are retrieved from main memory 140 and loaded into the processor core 100 as indicated on lines 480 and 482 (FIG. 4), the state again changes back to state 00 at block 510. The storage control unit 200 communicates to the thread registers 440 on line 484 (FIG. 4) when the virtual address for requested information is not available in the translation lookaside buffer 250, indicated as block 516, as a TLB miss or state 01. When the address does become available or if there is a data storage interrupt instruction as signaled by the storage control unit 200 on line 486 (FIG. 4), the state of the thread then returns to state 00, meaning ready for execution.

The number of states, and what each state represents is freely selectable by the computer architect. For instance, if a thread has multiple L1 cache misses, such as both a L1 I-cache miss and L1 D-cache miss, a separate state can be assigned to each type of cache miss. Alternatively, a single thread state could be assigned to represent more than one event or occurrence.

An example of a thread switch algorithm for two threads of equal priority which determines whether to switch threads is given. The algorithm can be expanded and modified accordingly for more threads and thread switch conditions according to the teachings of the invention. The interactions between the state of each thread stored in the thread state registers 440 (FIG. 4) and the priority of each thread by the thread switching algorithm are dynamically interrogated each cycle. If the active thread T0 has a L1 miss, the algorithm will cause a thread switch to the dormant thread T1 unless the dormant thread T1 is waiting for resolution of a L2 miss. If a switch did not occur and the L1 cache miss of active thread T0 turns into a L2 cache miss, the algorithm then directs the processor to switch to the dormant thread T1 regardless of the T1's state. If both threads are waiting for resolution of a L2 cache miss, the thread first having the L2 miss being resolved becomes the active thread. At every switch decision time, the action taken is optimized for the most likely case, resulting in the best performance. Note that thread switches resulting from a L2 cache miss are conditional on the state of the other thread, if not extra thread switches would occur resulting in loss of performance.

Thread Switch Control Register In a multithreaded processor, there are latency and performance penalties associated with switching threads. This latency includes the time required to complete execution of the current thread to a point where it can be interrupted and correctly restarted when it is next invoked, the time required to switch the thread-specific hardware facilities from the current thread's state to the new thread's state, and the time required to restart the new thread and begin its execution. In order to achieve optimal performance in a coarse grained multithreaded data processing system, the latency of an event which generates a thread switch must be greater than the performance cost associated with switching threads in a multithreaded mode, as opposed to the normal single-threaded mode.

The latency of an event used to generate a thread switch is dependent upon both hardware and software. For example, specific hardware considerations in a multithreaded processor include the speed of external SRAMs used to implement an L2 cache external to the processor chip. Fast SRAMs in the L2 cache reduce the average latency of an L1 miss while slower SRAMS increase the average latency of an L1 miss. Thus, performance is gained if one thread switch event is defined as a L1 cache miss in hardware having an external L2 cache data access latency greater than the thread switch penalty. As an example of how specific software code characteristics affect the latency of thread switch events, consider the L2 cache hit-to-miss ratio of the code, i.e., the number of times data is actually available in the L2 cache compared to the number of times data must be retrieved from main memory because data is not in the L2 cache. A high L2 hit-to-miss ratio reduces the average latency of an L1 cache miss because the L1 cache miss seldom results in a longer latency L2 miss. A low L2 hit-to-miss ratio increases the average latency of an L1 miss because more L1 misses result in longer latency L2 misses. Thus, a L1 cache miss could be disabled as a thread switch event if the executing code has a high L2 hit-to-miss ratio because the L2 cache data access latency is less than the thread switch penalty. A L1 cache miss would be enabled as a thread switch event when executing software code with a low L2 hit-to-miss ratio because the L1 cache miss is likely to turn into a longer latency L2 cache miss.

Some types of latency events are not readily detectable. For instance, in some systems the L2 cache outputs a signal to the instruction unit when a cache miss occurs. Other L2 caches, however, do not output such a signal, as in for example, if the L2 cache controller were on a separate chip from the processor and accordingly, the processor cannot readily determine a state change. In these architectures, the processor can include a cycle counter for each outstanding L1 cache miss. If the miss data has not been returned from the L2 cache after a predetermined number of cycles, the processor acts as if there had been a L2 cache miss and changes the thread's state accordingly. This algorithm is also applicable to other cases where there are more than one distinct type of latency. As an example only, for a L2 cache miss in a multiprocessor, the latency of data from main memory may be significantly different than the latency of data from another processor. These two events may be assigned different states in the thread state register. If no signal exists to distinguish the states, a counter may be used to estimate which state the thread should be in after it encounters a L2 cache miss.

The thread switch control register 410 is a software programmable register which selects the events to generate thread switching and has a separate enable bit for each defined thread switch event. Although the embodiment described herein does not implement a separate thread switch control register 410 for each thread, separate thread switch control registers 410 for each thread could be implemented to provide more flexibility and performance at the cost of more hardware and complexity.

The thread switch control register 410 can be written by a service processor with software such as a dynamic scan communications interface disclosed in U.S. Pat. No. 5,079,725 entitled *Chip Identification Method for Use with Scan Design Systems and Scan Testing Techniques* or by the processor itself with software system code. The contents of the thread switch control register 410 is used by the thread switch controller 450 to enable or disable the generation of a thread switch. A value of one in the register 410 enables the event associated with that bit to generate a thread switch. A value of zero in the thread switch control register 410 disables the event associated with that bit from generating a thread switch. Of course, an instruction in the executing thread could disable any or all of the thread switch conditions for that particular or for other threads. The following table shows the association between thread switch events and their enable bits in the register 410.

Thread Switch Control Register Bit Assignment (0) Switch on L1 data cache fetch miss
(1) Switch on L1 data cache store miss
(2) Switch on L1 instruction cache miss
(3) Switch on instruction TLB miss
(4) Switch on L2 cache fetch miss
(5) Switch on L2 cache store miss
(6) Switch on L2 instruction cache miss
(7) Switch on data TLB/segment lookaside buffer miss
(8) Switch on L2 cache miss and dormant thread not L2 cache miss
(9) Switch when thread switch time-out value reached
(10) Switch when L2 cache data returned
(11) Switch on IO external accesses
(12) Switch on double-X store: miss on first of two*
(13) Switch on double-X store: miss on second of two*
(14) Switch on store multiple/string: miss on any access
(15) Switch on load multiple/string: miss on any access
(16) Reserved
(17) Switch on double-X load: miss on first of two*
(18) Switch on double-X load: miss on second of two*
(19) Switch on or 1,1,1 instruction if machine state register (problem state) bit, msr(pr)=1. Allows software priority change independent of msr(pr). If bit 19 is one, or 1,1,1 instruction sets low priority. If bit 19 is zero, priority is set to low only if msr(pr)=0 when the or 1,1,1 instruction is executed. See changing priority with software, to be discussed later.
(20) Reserved
(21) Thread switch priority enable
(22:29) Reserved
(30:31) Forward progress count
(32:63) Reserved in 64 bit register implementation * A double-X load/store refers to loading or storing an elementary halfword, a word, or a double word, that crosses a doubleword boundary. A double-X load/store in this context is not a load or store of multiple words or a string of words.

Thread Switch Time-out Register

As discussed above, coarse grained multithreaded processors rely on long latency events to trigger thread switching. Sometimes during execution, a processor in a multiprocessor environment or a background thread in a multithreaded architecture, has ownership of a resource that can have only a single owner and another processor or active thread requires access to the resource before it can make forward progress. Examples include updating a memory page table or obtaining a task from a task dispatcher. The inability of the active thread to obtain ownership of the resource does not result in a thread switch event, nonetheless, the thread is spinning in a loop unable to do useful work. In this case, the background thread that holds the resource does not obtain access to the processor so that it can free up the resource because it never encountered a thread switch event and does not become the active thread.

Allocating processing cycles among the threads is another concern; if software code running on a thread seldom encounters long latency switch events compared to software code running on the other threads in the same processor, that thread will get more than it's fair share of processing cycles. Yet another excessive delay that may exceed the maximum acceptable time is the latency of an inactive thread waiting to service an external interrupt within a limited period of time or some other event external to the processor. Thus, it becomes preferable to force a thread switch to the dormant thread after some time if no useful processing is being accomplished to prevent the system from hanging.

The logic to force a thread switch after a period of time is a thread switch time-out register 430 (FIG. 4), a decrementer, and a decrementer register to hold the decremented value. The thread switch time-out register 430 holds a thread switch time-out value. The thread switch time-out register 430 implementation used in this embodiment is shown in the following table:

Thread Switch Time-out Register Bits (0:21) Reserved
(22:31) Thread switch time-out value The embodiment of the invention described herein does not implement a separate thread switch time-out register 430 for each thread, although that could be done to provide more flexibility. Similarly, if there are multiple threads, each thread need not have the same thread switch time-out value.

Each time a thread switch occurs, the thread switch time-out value from the thread switch time-out register 430 is loaded by hardware into the decrement register. The decrement register is decremented once each cycle until the decrement register value equals zero, then a signal is sent to the thread switch controller 450 which forces a thread switch unless no other thread is ready to process instructions. For example, if all other threads in the system are waiting on a cache miss and are not ready to execute instructions, the thread switch controller 450 does not force a thread switch. If no other thread is ready to process instructions when the value in the decrement register reaches zero, the decremented value is frozen at zero until another thread is ready to process instructions, at which point a thread switch occurs and the decrement register is reloaded with a thread switch time-out value for that thread. Similarly, the decrement register could just as easily be named an increment register and when a thread is executing the register could increment up to some predetermined value when a thread switch would be forced.

The thread switch time-out register 430 can be written by a service processor as described above or by the processor itself with software code. The thread switch time-out value loaded into the thread switch time-out register 430 can be customized according to specific hardware configuration and/or specific software code to minimize wasted cycles resulting from unnecessary thread switching. Too high of a value in the thread switch time-out register 430 can result in reduced performance when the active thread is waiting for a resource held by another thread or if response latency for an external interrupt or some other event external to the processor is too long. Too high of a value can also prevent fairness if one thread experiences a high number of thread switch events and the other does not. A thread switch time-out value twice to several times longer than the most frequent longest latency event that causes a thread switch is recommended, e.g., access to main memory. Forcing a thread switch after waiting the number of cycles specified in the thread switch time-out register 430 prevents system hangs due to shared resource contention, enforces fairness of processor cycle allocation between threads, and limits the maximum response latency to external interrupts and other events external to the processor.

Forward Progress Guarantee

That at least one instruction must be executed each time a thread switch occurs and becomes active is too restrictive in certain circumstances, such as when a single instruction generates multiple cache accesses and/or multiple cache misses. For example, a fetch instruction may cause an L1 I-cache 150 miss if the instruction requested is not in the cache; but when the instruction returns, required data may not be available in the L1 D-cache 120. Likewise, a miss in translation lookaside buffer 250 can also result in a data cache miss. So, if forward progress is strictly enforced, misses on subsequent accesses do not result in thread switches. A second problem is that some cache misses may require a large number of cycles to complete, during which time another thread may experience a cache miss at the same cache level which can be completed in much less time. If, when returning to the first thread, the strict forward progress is enforced, the processor is unable to switch to the thread with the shorter cache miss.

To remedy the problem of thrashing wherein each thread is locked in a repetitive cycle of switching threads without any instructions executing, there exists a forward progress count register 420 (FIG. 4) which allows up to a programmable maximum number of thread switches called the forward progress threshold value. After that maximum number of thread switches, an instruction must be completed before switching can occur again. In this way, thrashing is prevented. Forward progress count register 420 may actually be bits 30:31 in the thread switch control register 410 or a software programmable forward progress threshold register for the processor. The forward progress count logic uses bits 15:17 of the thread state registers 442, 444 that indicate the state of the threads and are allocated for the number of thread switches a thread has experienced without an instruction executing.

When a thread changes state invoking the thread switch algorithm, if at least one instruction has completed in the active thread, the forward-progress counter for the active thread is reset and the thread switch algorithm continues to compare thread states between the threads in the processor. If no instruction has completed, the forward-progress counter value of the active thread is compared to the forward progress threshold value. If the counter value is less than the threshold value, the thread switch algorithm continues to evaluate the thread states of the threads in the processor. Then if a thread switch occurs, the forward-progress counter is incremented. If, however, the counter value is equal to the threshold value, no thread switch will occur until an instruction can execute, i.e., until forward progress occurs. Note that if the threshold register has value zero, at least one instruction must complete within the active thread before switching to another thread. If each thread switch requires three processor cycles and if there are two threads and if the thread switch logic is programmed to stop trying to switch threads after five tries; then the maximum number of cycles that the processor will thrash is thirty cycles. One of skill in the art can appreciate that there a potential conflict exists between prohibiting a thread switch because no forward progress will be made on one hand and, on the other hand, forcing a thread switch because the time-out count has been exceeded. Such a conflict can easily be resolved according to architecture and software.

Figure 6:
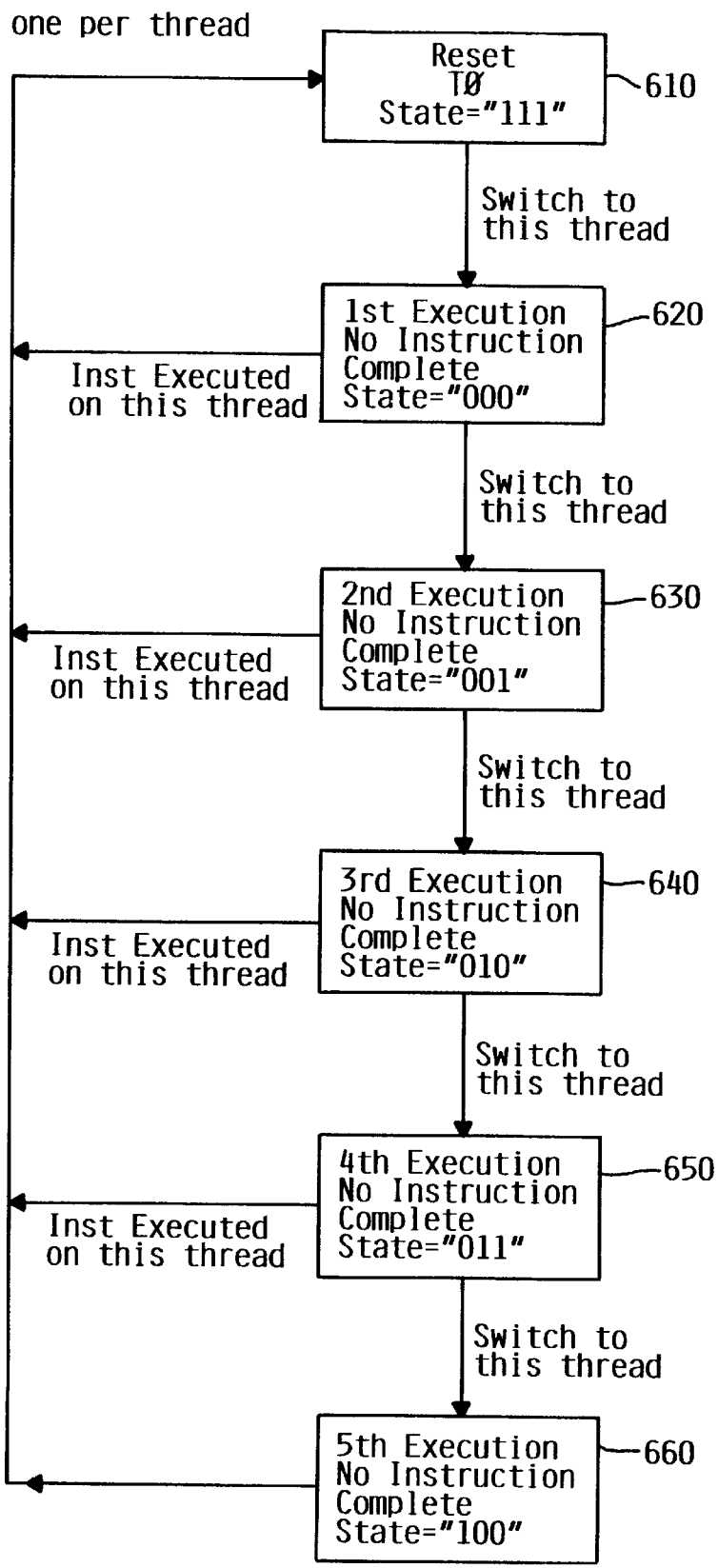
FIG. 6 is a flow chart of the forward progress count of the invention.

FIG. 6 is a flowchart of the forward progress count feature of thread switch logic 400 which prevents thrashing. At block 610, bits 15:17 in thread state register 442 pertaining to thread T0 are reset to state 111. Execution of this thread is attempted in block 620 and the state changes to 000. If an instruction successfully executes on thread T0, the state of thread T0 returns to 111 and remains so. If, however, thread T0 cannot execute an instruction, a thread switch occurs to thread T1, or another background thread if more than two threads are permitted in the processor architecture. When a thread switch occurs away from T1 or the other background thread and execution returns to thread T0, a second attempt to execute thread T0 occurs and the state of thread T0 becomes 001 as in block 630. Again, if thread T0 encounters a thread switch event, control of the processor is switched away from thread T0 to another thread. Similarly, whenever a thread switch occurs from the other thread, e.g., T1, back to thread T0, the state of T0 changes to 010 on this third attempt to execute T0 (block 640); to 011 on the fourth attempt to execute T0 (block 650), and to state 100 on the fifth attempt to execute T0 (block 660).

In this implementation, there are five attempts to switch to thread T0. After the fifth attempt or whenever the value of bits 15:17 in the thread state register TSR) 442 is equal to the value of bits 30:31 plus one in the thread switch control register (TSC) 410, i.e., whenever TSC(30:31)+1=TSR (15:17), no thread switch away from thread T0 occurs. It will be appreciated that five attempts is an arbitrary number; the maximum number of allowable switches with unsuccessful execution is programmable and it may be realized in certain architectures that five is too many switches, and in other architectures, five is too few. In any event, the relationship between the number of times that an attempt to switch to a thread with no instructions executing must be compared with a maximum value and once that maximum value has been reached, no thread switch occurs away from that thread and the processor waits until the latency associated with that thread is resolved. In the embodiment described herein, the state of the thread represented by bits 15:17 of the thread state register 442 is compared with bits 30:31 in the thread switch control register 410. Special handling for particular events that have extremely long latency, such as interaction with input/output devices, to prevent prematurely blocking thread switching with forward progress logic improves processor performance. One way to handle these extremely long latency events is to block the incrementing of the forward progress counter or ignore the output signal of the comparison between the forward progress counter and the threshold value if data has not returned. Another way to handle extremely long latency events is to use a separate larger forward progress count for these particular events.

Thread Switch Manager

The thread state for all software threads dispatched to the processor is preferably maintained in the thread state registers 442 and 444 of FIG. 4 as described. In a single processor one thread executes its instructions at a time and all other threads are dormant. Execution is switched from the active thread to a dormant thread when the active thread encounters a long-latency event as discussed above with respect to the forward progress register 420, the thread switch control register 410, or the thread switch time-out register 430. Independent of which thread is active, these hardware registers use conditions that do not dynamically change during the course of execution.

Flexibility to change thread switch conditions by a thread switch manager improves overall system performance. A software thread switch manager can alter the frequency of thread switching, increase execution cycles available for a critical task, and decrease the overall cycles lost because of thread switch latency. The thread switch manager can be programmed either at compile time or during execution by the operating system, e.g., a locking loop can change the frequency of thread switches; or an operating system task can be dispatched because a dormant thread in a lower priority state is waiting for an external interrupt or is otherwise ready. It may be advantageous to disallow or decrease the frequency of thread switches away from an active thread so that performance of the current instruction stream does not suffer the latencies resulting from switching into and out of it. Alternatively, a thread can forgo some or all of its execution cycles by essentially lowering its priority, and as a result, decrease the frequency of switches into it or increase the frequency of switches out of the thread to enhance overall system performance. The thread switch manager may also unconditionally force or inhibit a thread switch, or influence which thread is next selected for execution.

A multiple-priority thread switching scheme assigns a priority value to each thread to qualify the conditions that cause a switch. It may also be desirable in some cases to have the hardware alter thread priority. For instance, a low-priority thread may be waiting on some event, which when it occurs, the hardware can raise the priority of the thread to influence the response time of the thread to the event. Relative priorities between threads or the priority of a certain thread will influence the handling of such an event. The priorities of the threads can be adjusted by the thread switch manager through the use of one or more instructions, or by hardware in response to an event. The thread switch manager alters the actions performed by the hardware thread switch logic to effectively change the relative priority of the threads.

Three priorities are used with the embodiment described herein of two threads and provides sufficient distinction between threads to allow tuning of performance without adversely affecting system performance. With three priorities, two threads can have an equal status of medium priority. The choice of three priorities for two threads is not intended to be limiting. In some architectures a "normal" state may be that one thread always has a higher priority than the other threads. It is intended to be within the scope of the invention to cover more than two threads of execution having one or multiple priorities that can be set in hardware or programmed by software.

The three priorities of each thread are high, medium, and low. When the priority of thread T0 is the same as thread T1, there is no effect on the thread switching logic. Both threads have equal priority so neither is given an execution time advantage. When the priority of thread T0 is greater than the priority of thread T1, thread switching from T0 to T1 is disabled for all L1 cache misses, i.e., data load, data store, and instruction fetch, because L1 cache misses are resolved much faster than other conditions such as L2 misses and translates. Thread T0 is given a better chance of receiving more execution cycles than thread T1 which allows thread T0 to continue execution so long as it does not waste an excessive number of execution cycles. The processor, however, will still relinquish control to thread T1 if thread T0 experiences a relatively long execution latency. Thread switching from T1 to T0 is unaffected, except that a switch occurs when dormant thread T0 is ready in which case thread T0 preempts thread T1. This case would be expected to occur when thread T0 switches away because of an L2 cache miss or translation request, and the condition is resolved in the background while thread T0 is executing. The case of thread T0 having a priority less than thread T1 is analogous to the case above, with the thread designation reversed.

There are different possible approaches to implementing management of thread switching by changing thread priority. New instructions can be added to the processor architecture. Existing processor instructions having side effects that have the desired actions can also be used. Several factors influence the choice among the methods of allowing software control: (a) the ease of redefining architecture to include new instructions and the effect of architecture changes on existing processors; (b) the desirability of running identical software on different versions of processors; (c) the performance tradeoffs between using new, special purpose instructions versus reusing existing instructions and defining resultant side effects; (d) the desired level of control by the software, e.g., whether the effect can be caused by every execution of some existing instruction, such as a specific load or store, or whether more control is needed, by adding an instruction to the stream to specifically cause the effect.

The architecture described herein preferably takes advantage of an unused instruction whose values do not change the architected general purpose registers of the processor; this feature is critical for retrofitting multithreading capabilities into a processor architecture. Otherwise special instructions can be coded. The instruction is a "preferred nop" or 0,0,0; other instructions, however, can effectively act as a nop. By using different versions of the or instruction, or 0,0,0 or 1,1,1 etc. to alter thread priority, the same instruction stream may execute on a processor without adverse effects such as illegal instruction interrupts. An extension uses the state of the machine state register to alter the meaning of these instructions. For example, it may be undesirable to allow a user to code some or all of these thread priority instructions and access the functions they provide. The special functions they provide may be defined to occur only in certain modes of execution, they will have no effect in other modes and will be executed normally, as a nop.

One possible implementation, using a dual-thread multi-threaded processor, uses three instructions which become part of the executing software itself to change the priority of itself:

tsop 1 or 1,1,1—Switch to dormant thread tsop 2 or 1,1,1—Set active thread to LOW priority
—Switch to dormant thread
—NOTE: Only valid in privileged mode unless TSC [19]=1 tsop 3 or 2,2,2—Set active thread to MEDIUM priority tsop 4 or 3,3,3—Set active thread to HIGH priority
NOTE: Only valid in privileged mode Instructions tsop 1 and tsop 2 can be the same instruction as embodied herein as or 1,1,1 but they can also be separate instructions. These instructions interact with bits 19 and 21 of the thread switch control register 410 and the problem/privilege bit of the machine state register as described herein. If bit 21 of the thread switch control register 410 has a value of one, the thread switch manager can set the priority of its thread to one of three priorities represented in the thread state register at bits 18:19. If bit 19 of the thread switch control register 410 has a value zero, then the instruction tsop 2 thread switch and thread priority setting is controlled by the problem/privilege bit of the machine state register. On the other hand, if bit 19 of the thread switch control register 410 has a value one, or if the problem/privilege bit of the machine state register has a value zero and the instruction or 1,1,1 is present in the code, the priority for the active thread is set to low and execution is immediately switched to the dormant or background thread if the dormant thread is enabled. The instruction or 2,2,2 sets the priority of the active thread to medium regardless of the value of the problem/privilege bit of the machine state register. And the instruction or 3,3,3, when the problem/privilege bit of the machine state register bit has a value of zero, sets the priority of the active thread to high. If bit 21 of the thread switch control register 320 is zero, the priority for both threads is set to medium and the effect of the or x,x,x instructions on the priority is blocked. If an external interrupt request is active, and if the corresponding thread's priority is low, that thread's priority is set to medium.

The events altered by the thread priorities are: (1) switch on L1 D-cache miss to load data; (2) switch on L1 D-cache miss for storing data; (3) switch on L1 I-cache miss on an instruction fetch; and (4) switch if the dormant thread in ready state. In addition, external interrupt activation may alter the corresponding thread's priority. The following table shows the effect of priority on conditions that cause a thread switch. A simple TSC entry in columns three and four means to use the conditions set forth in the thread switch control (TSC) register 410 to initiate a thread switch. An entry of TSC[0:2] treated as 0 means that bits 0:2 of the thread switch control register 410 are treated as if the value of those bits are zero for that thread and the other bits in the thread switch control register 410 are used as is for defining the conditions that cause thread switches. The phrase when thread T0 ready in column four means that a switch to thread T0 occurs as soon as thread T0 is no longer waiting on the miss event that caused it to be switched out. The phrase when thread T1 ready in column 3 means that a switch to thread T1 occurs as soon as thread T1 is no longer waiting on the miss event that caused it to be switched out. If the miss event is a thread switch time-out, there is no guarantee that the lower priority thread completes an instruction before the higher priority thread switches back in.

| T0 Priority | T1 Priority | T0 Thread Switch Conditions | T1 Thread Switch Conditions |
|---|---|---|---|
| High | High | TSC | TSC |
| High | Medium | TSC[0:2] treated as 0 | TSC or if T0 ready |
| High | Low | TSC[0:2] treated as 0 | TSC or if T0 ready |
| Medium | High | TSC or if T1 ready | TSC[0:2] treated as 0 |
| Medium | Medium | TSC | TSC |
| Medium | Low | TSC[0:2] treated as 0 | TSC or if T0 ready |
| Low | High | TSC or if T1 ready | TSC[0:2] treated as 0 |
| Low | Medium | TSC or if T1 ready | TSC[0:2] treated as 0 |
| Low | Low | TSC | TSC |

It is recommended that a thread doing no productive work be given low priority to avoid a loss in performance even if every instruction in the idle loop causes a thread switch. Yet, it is still important to allow hardware to alter thread priority if an external interrupt is requested to a thread set at low priority. In this case the thread is raised to medium priority, to allow a quicker response to the interrupt. This allows a thread waiting on an external event to set itself at low priority, where it will stay until the event is signalled.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method of computer processing, comprising:
   (a) setting a first time-out value;
   (b) loading a decrementer register when a thread switch occurs to a first thread;
   (c) executing the first thread of instructions in a multi-threaded processor;
   (d) decrementing the decrementer register every time period the first thread executes until the decrementer register reaches a first limit;
   (e) sending a first time-out signal to a thread switch controller when the first limit is equivalent to the first time-out value and the first thread of instructions is not performing useful processing.

2. The method of claim 1, further comprising:
   (f) switching execution from the first thread in response to the first time-out signal from the thread switch controller.

3. The method of claim 1, further comprising:
   (f) setting a second time-out value;
   (g) loading the decrementer register when a thread switch occurs to a second thread;
   (h) decrementing the decrementer every time period the second thread executes until the decrementer register reaches a second limit;
   (i) sending a second time-out signal to the thread switch controller when the second limit is equivalent to the second time-out value and the second thread is not performing useful processing.

4. The method of claim 3, further comprising:
(j) switching execution from the second thread in response to the second time-out signal.

5. A method of computer processing, comprising:
(a) setting a first time-out value;
(b) loading a decrementer register when a thread switch occurs to a first thread;
(c) executing the first thread of instructions in a multithreaded processor;
(d) decrementing the decrementer register every period the first thread executes until the decrementer register reaches a first limit;
(e) sending a first time-out signal to a thread switch controller when the first limit is equivalent to the first time-out value
(f) setting a second time-out value different from the first time-out value;
(g) loading the decrementer register when a thread switch occurs to a second thread;
(h) decrementing the decrementer every time period the second thread executes until the decrementer register reaches a second limit;
(i) sending a second time-out signal to the thread switch controller when the second limit is equivalent to the second time-out value.

6. A method of computer processing, comprising:
(a) loading a decrementer register when a thread switch occurs to a first thread;
(b) setting a first time-out value less than five times longer than a most frequent longest latency event which inhibits the first thread from executing;
(c) executing the first thread of instructions in a multithreaded processor;
(d) decrementing the decrementer register every period the first thread executes until the decrementer register reaches a first limit;
(e) sending a first time-out signal to a thread switch controller when the first limit is equivalent to the first time-out value.

7. The method of claim 6 wherein the most frequent longest latency event is access to a main memory of the multithread processor.

8. A computer processor, comprising:
(a) a multithreaded processor capable of switching between at least two threads of instructions, at least one of the threads being an active thread executing instructions in the multithreaded processor;
(b) a time-out counter which counts the number of cycles that the active thread executes; and
(c) a time-out register operatively connected to the multithreaded processor and having a predetermined number which generates a time-out signal when the time-out counter equals the predetermined number in the time-out register and the active thread is unable to perform useful processing of instructions.

9. The processor of claim 8, further comprising:
(d) a thread switch controller which sends a switch signal to said multithreaded processor in response to the time-out signal and forces the multithreaded processor to switch to another of said at least two threads.

10. The processor of claim 8 wherein the predetermined number of the time-out register is programmable.

11. The computer processor of claim 8 wherein the active thread is unable to perform useful processing when the active thread is unable to obtain ownership of a resource of a computer system of which the computer processor is part.

12. The computer processor of claim 8 wherein the active thread is unable to perform useful processing when an inactive thread is waiting to service an interrupt within a limited period of time.

13. The computer processor of claim 8, further comprising:
a thread switch controller which sends a switch signal to said multithreaded processor in response to the time-out signal and forces the multithreaded processor to switch to another of said at least two threads unless all other of said at least two threads are not ready to process instructions.

14. A computer system, comprising:
(a) a multithreaded processor capable of switching processing between at least two threads of instructions when the multithreaded processor experiences one of a plurality of processor latency events;
(b) a plurality of internal connections connecting the multithreaded processor to a plurality of memory elements wherein access to any of the plurality of memory elements by the multithreaded processor causes one of the plurality of processor latency events;
(c) a plurality of external connections connecting the multithreaded processor to at least one external memory device, at least one external communication device, an external computer network, or at least one input/output device wherein access to any of the devices or the network by the multithreaded processor causes one of the plurality of processor latency events
(d) at least one time-out counter which counts the number of cycles that each of the at least two threads of instructions executes;
(e) at least one time-out register operatively connected to the multithreaded processor and having a predetermined number which generates a time-out signal when the at least one time-out counter equals the predetermined number in the at least one time-out register;
(f) a thread switch controller which sends a switch signal to said multithreaded processor in response to the time-out signal and forces the multithreaded processor to switch to another of the at least two threads.

15. A computer processor, comprising:
(a) means for processing a thread of instructions;
(b) means for switching said thread of instructions into or out of said processing means;
(c) means for counting a number of cycles that said processing means is processing;
(d) means for storing a time-out value; and
(e) means for generating a time-out signal when said number of cycles is equal to said time-out value and said thread of instructions is not performing useful processing when said thread is in said processing means.

16. The computer processor of claim 15, wherein said switching means switches said thread of instructions out of said processing means in response to said time-out signal.

17. The computer processor of claim 15 wherein said switching means does not switch said thread of instructions out of said processing means in response to said time-out signal because no other threads of instructions are ready to process instructions.

* * * * *